United States Patent
Duffy et al.

(10) Patent No.: US 8,226,146 B2
(45) Date of Patent: Jul. 24, 2012

(54) TAILGATE DAMPENING SYSTEM

(75) Inventors: Michael Duffy, Midland (CA); Andrew McIntyre, Midland (CA); Donald M. Austin, Perkinsfiled (CA)

(73) Assignee: M&C Corporation, Sterling Heights, MI (US)

( * ) Notice: Subject to any disclaimer, the term of this patent is extended or adjusted under 35 U.S.C. 154(b) by 434 days.

(21) Appl. No.: 12/153,714

(22) Filed: May 22, 2008

(65) Prior Publication Data

US 2009/0302630 A1     Dec. 10, 2009

Related U.S. Application Data

(60) Provisional application No. 60/924,629, filed on May 23, 2007.

(51) Int. Cl.
*B62D 33/03* (2006.01)

(52) U.S. Cl. ............... 296/57.1; 296/50; 296/56; 16/84; 16/82

(58) Field of Classification Search .............. 296/57.1, 296/59, 146.1, 50, 53, 146.8; 16/75, 308, 16/82, 84; 49/386, 389, 322, 181; 267/64.12
See application file for complete search history.

(56) References Cited

U.S. PATENT DOCUMENTS

| | | | | |
|---|---|---|---|---|
| 4,514,878 | A | * | 5/1985 | Arneberg ........................ 16/300 |
| 4,596,383 | A | * | 6/1986 | Howard ...................... 267/64.12 |
| 4,709,445 | A | * | 12/1987 | Waldo et al. .................... 16/300 |
| 4,828,236 | A | * | 5/1989 | Inoue .............................. 267/182 |
| 5,084,939 | A | * | 2/1992 | Garman ........................... 16/84 |
| 5,178,243 | A | * | 1/1993 | Hamada et al. ........... 188/322.17 |
| 5,533,598 | A | * | 7/1996 | Adrian et al. ............. 188/322.17 |
| 6,272,825 | B1 | * | 8/2001 | Anderson et al. ............... 56/341 |
| 6,357,734 | B1 | * | 3/2002 | Lisenker et al. .............. 267/221 |
| 6,773,047 | B2 | * | 8/2004 | Gruber ......................... 296/57.1 |
| 6,846,030 | B2 | * | 1/2005 | Koehler et al. ................. 296/50 |
| 6,893,203 | B2 | * | 5/2005 | Anderson et al. ............. 414/557 |
| 6,905,156 | B2 | * | 6/2005 | Miller et al. .................... 296/50 |
| 7,147,260 | B2 | * | 12/2006 | Eschebach et al. .......... 296/57.1 |
| 2007/0096492 | A1 | * | 5/2007 | Austin ............................ 296/50 |

* cited by examiner

*Primary Examiner* — Glenn Dayoan
*Assistant Examiner* — Sunsurraye Westbrook
(74) *Attorney, Agent, or Firm* — Nixon & Vanderhye PC

(57) ABSTRACT

A tailgate dampening system for a vehicle including a tailgate lift assist system including a torque rod rotationally grounded between the tailgate at a first end and a first side of the vehicle's frame at a second end is disclosed. The dampening system includes a coupling shaft attached to one end of the torque rod, a bell crank arm attached to the coupling shaft, and a dampening strut attached between the vehicle's frame and the bell crank arm. The crank arm compresses the dampening strut as the crank arm is rotated by the torque rod through the coupling shaft as the torque rod is twisted in response to the tailgate being opened, so as to reduce the rate at which the tailgate falls.

21 Claims, 5 Drawing Sheets

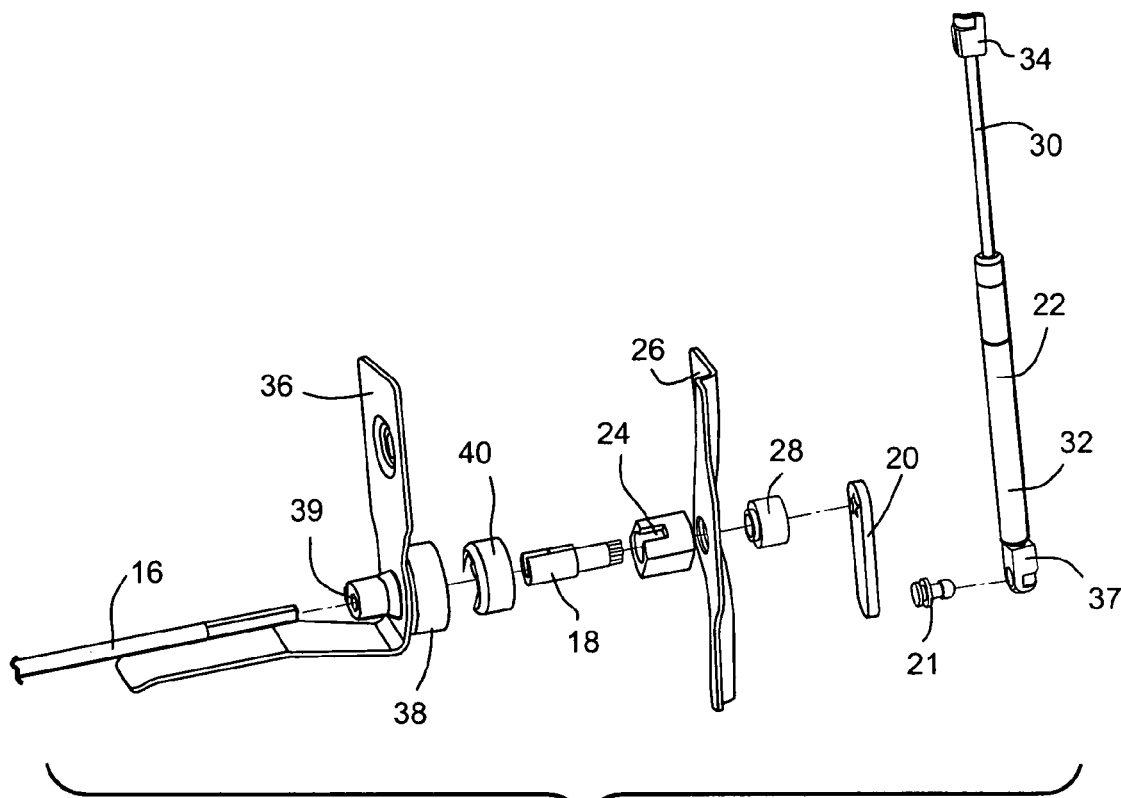
FIG. 2
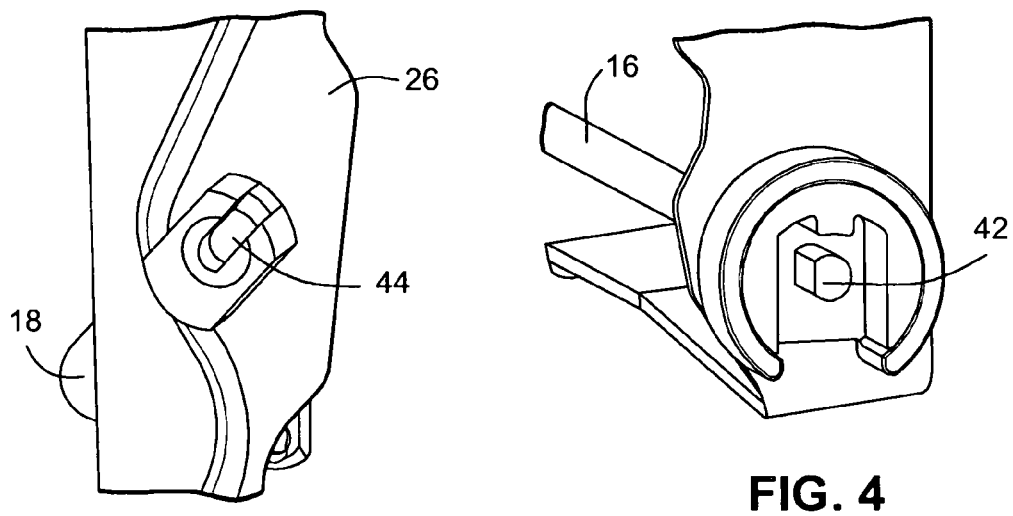
FIG. 3
FIG. 4

TAILGATE DAMPENING SYSTEM

CROSS-REFERENCE TO RELATED APPLICATION

This application claims the benefit of Provisional Application No. 60/924,629, filed May 23, 2007, the entire content of which is hereby incorporated by reference in this application.

FIELD OF THE INVENTION

The present invention relates to vehicle tailgate lift assist assemblies, and more particularly to a dampening system used with such lift assist assemblies.

BACKGROUND OF THE INVENTION

Vehicle body closure members, such as tailgates, are typically pivotally mounted between body side panels forming the pillars at the rear of the vehicle. The tailgate typically pivots about a hinge axis between a horizontal, open position and a vertical, closed position. Some tailgate mounting assemblies include a counterbalancing hinge assembly for assisting movement of the tailgate and counterbalancing the weight of the tailgate during opening and closing movements.

Tailgate counterbalancing hinge assembly often include a torque rod that is grounded on one end to the vehicle's tailgate and on the other end to the vehicle so that the torque rod is twisted as the tailgate is moved between open and closed positions.

Although torque rod based tailgate counter balancing hinge designs reduce the effort required to raise and lower a tailgate by storing energy in the twisting of the torque rod during opening/lowering, because of the residual kinetic energy stored in the tailgate, the tailgate, when free falling, can cause objectionable impact on the supports straps or on a vehicle operator. Indeed, because a tailgate can be heavy and hard to lift when being closed, or it can drop down quickly when being opened, and thus cause injury to a vehicle operator, the present invention solves these problems by de-accelerating the tailgate and having it come to a gradual stop at the open position, reducing possibility of operator injury or the gate crashing down on check straps that may be mounted to the vehicle box and that keep the tailgate from over traveling.

BRIEF DESCRIPTION OF THE INVENTION

A tailgate dampening system for a vehicle including a tailgate lift assist system including a torque rod rotationally grounded between the tailgate at a first end and a first side of the vehicle's frame at a second end is disclosed. The dampening system includes a coupling shaft attached to one end of the torque rod, a bell crank arm attached to the coupling shaft, and a dampening strut attached between the vehicle's frame and the bell crank arm. The crank arm compresses the dampening strut as the crank arm is rotated by the torque rod through the coupling shaft as the torque rod is twisted in response to the tailgate being opened, so as to reduce the rate at which the tailgate falls.

BRIEF DESCRIPTION OF THE DRAWINGS

FIG. 2 is an exploded, perspective view showing the components of the tailgate dampening system of the present invention and the components for coupling the tailgate dampening system to the tailgate lift assist system.

FIG. 3 is a perspective view showing the body side components for coupling the tailgate dampening system to the tailgate lift assist system.

FIG. 4 is a perspective view showing the tailgate side components for coupling the tailgate dampening system to the tailgate lift assist system.

DETAILED DESCRIPTION OF THE INVENTION

Figure 1A:
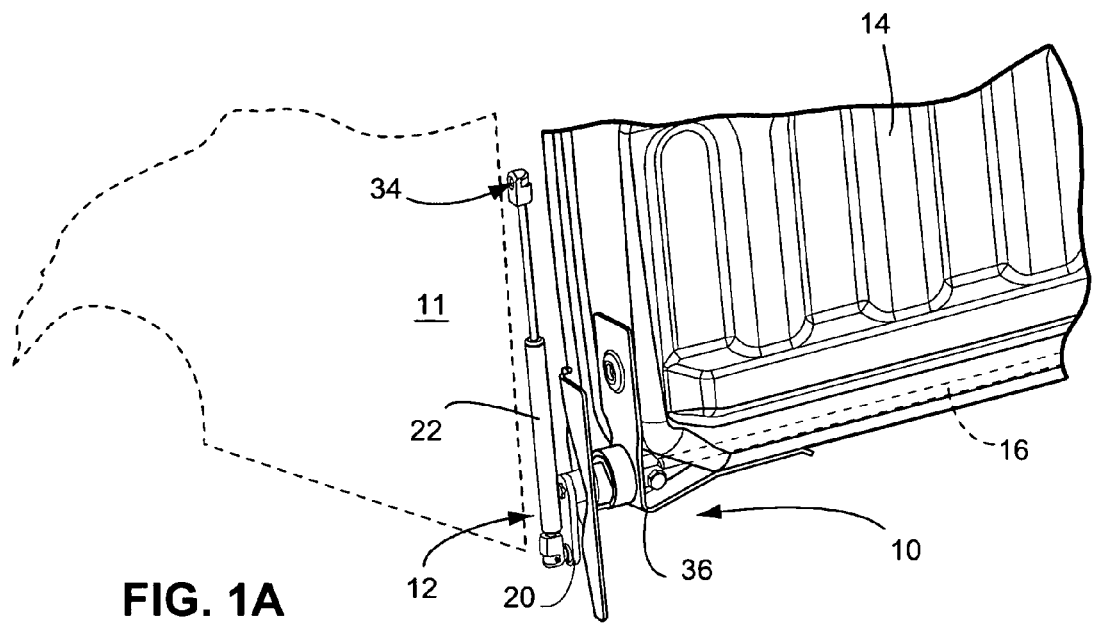
FIGS. 1A and 1B are perspective views showing the two sides of a vehicle tailgate lift assist system, with the side of the lift assist system shown in FIG. 1A being coupled to the tailgate dampening system of the present invention for controlling the rate of descent of the vehicle's tailgate.
Figure 1B:
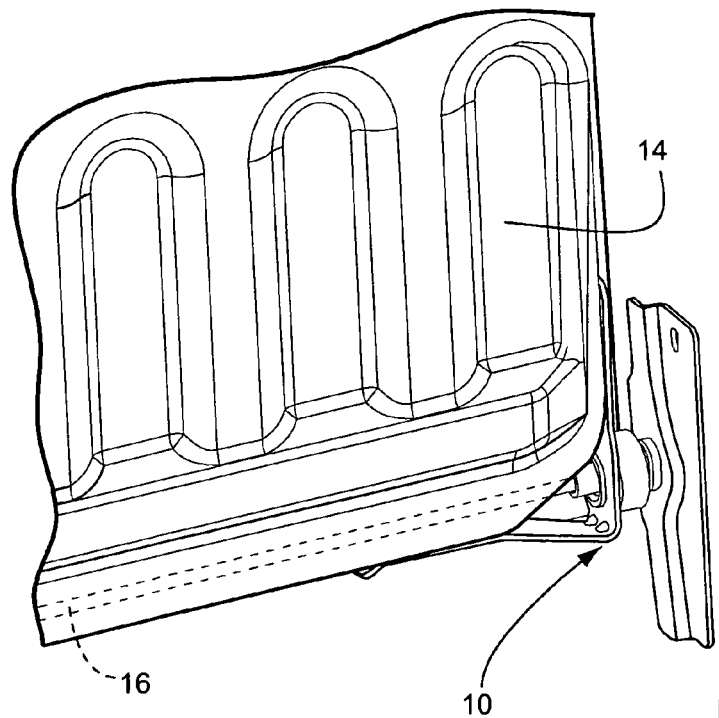

FIGS. 1A and 1B are perspective views showing the two sides of a vehicle tailgate lift assist system 10, with the side of the lift assist system 10 shown in FIG. 1A coupled to a tailgate dampening system 12 of the present invention for controlling the rate of descent of the vehicle's tailgate 14. FIG. 2 is an exploded perspective view showing the components of the tailgate dampening system 12 of the present invention and the components for coupling the tailgate dampening system 12 to the tailgate lift assist system 10. FIG. 3 is a perspective view showing the body side components for coupling the tailgate dampening system 12 to the tailgate lift assist system 10. FIG. 4 is a perspective view showing the tailgate side components for coupling the tailgate dampening system 12 to the tailgate lift assist system 10.

The embodiment of the tailgate dampening system 12 shown in FIGS. 1A and 2 is designed, such that the torque rod 16 (shown partially in phantom in FIGS. 1A and 1B) of the tailgate lift assist system 10 is attached to a coupling shaft 18, which passes through a post 24 and a body bracket 26 attached to the side 11 of the vehicle's bed/frame. The coupling shaft 18 is then attached to one end of a bell crank arm 20 on the opposite side of the vehicle's bed/frame. Crank arm 20 is attached to an end 37 of a dampening strut 22 by a pivot pin 21. A spacer 28 provides clearance to the sidewall of the vehicle's body to which body bracket 26 is attached. As the tailgate 14 descends, the dampening strut 22 is compressed because a piston 30, protruding from a body 32 of strut 22, is attached to the vehicle's body at a body attachment point 34. As the tailgate 14 opens, torque rod 16, which provides lift assist, drives coupling shaft 18, which is attached to bell crank arm 20. As crank arm 20 is rotated by coupling shaft 18, it compresses piston 30 into body 32 of dampening strut 22. Piston 30 is metered, in that it contains at least one internal orifice (not shown) that lets a fluid, such as a hydraulic or pneumatic fluid, from a first side of piston 30 (also not shown) within body 32 of strut 22 move to a second side of piston 30 (also not shown) within body 32 of strut 22. The size of orifice controls the amount of fluid that can move from the first side to the second side at any given time, thereby absorbing and dissipating energy via viscous friction, so as to reduce the rate at which the tailgate 14 falls. The dampening strut 22 also contains an internal check valve, which allows an un-metered flow of fluid from the second compartment to the first compartment, thereby reducing the dampening in the opposite direction and allowing the tailgate 14 to be closed with minimal resistance.

To allow for the removal of the tailgate, the coupling shaft 18 has a slot, which aligns with a slot in the body bracket post 24 when the gate 14 is rotated to a certain angle. When aligned, the slot permits the torsion rod 16 to decouple from the shaft 18, which allows the tailgate 14 to be removed from the vehicle.

The tailgate lift assist system 10 includes a gate bracket 36 mounted to the side of tailgate 14. Pressed into bracket 36 is a bushing 38 having a stem 39 through which torque rod 16 is inserted. Positioned within bushing 38 is a pivot body 40 around which bushing 38 rotates. As shown in FIG. 4, an end 42 of torque rod 16 protrudes out of bushing 38. End 42 of torque rod 16 engages a corresponding end of coupling shaft 18, so as to rotate coupling shaft 18 as torque rod 16 is twisted with the opening or closing of tailgate 14. As shown in FIG. 3, coupling shaft 18 includes an elongated key 44 which is attached to one end of crank arm 20, and which drives crank arm 20 as coupling shaft 18 is rotated by torque rod 16 being twisted.

Figure 5A:
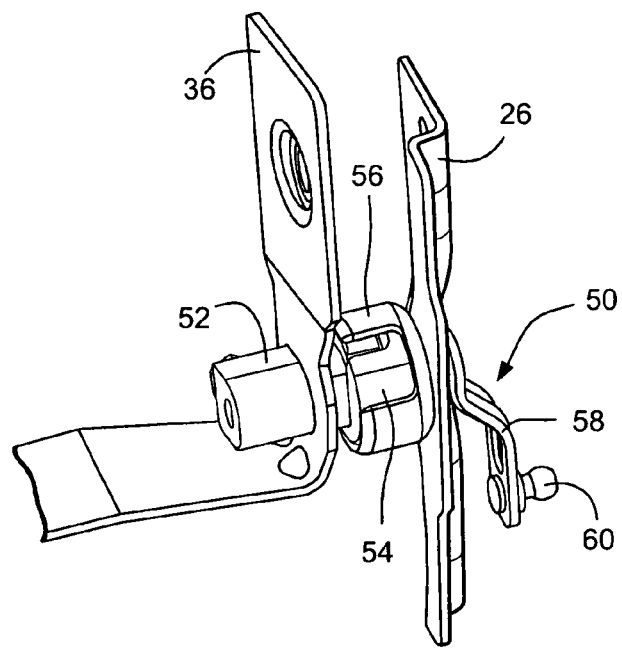
FIGS. 5A and 5B are assembled and exploded perspective views, respectively, of a first alternative embodiment of components for coupling the tailgate dampening system to the tailgate lift assist system.
Figure 5B:
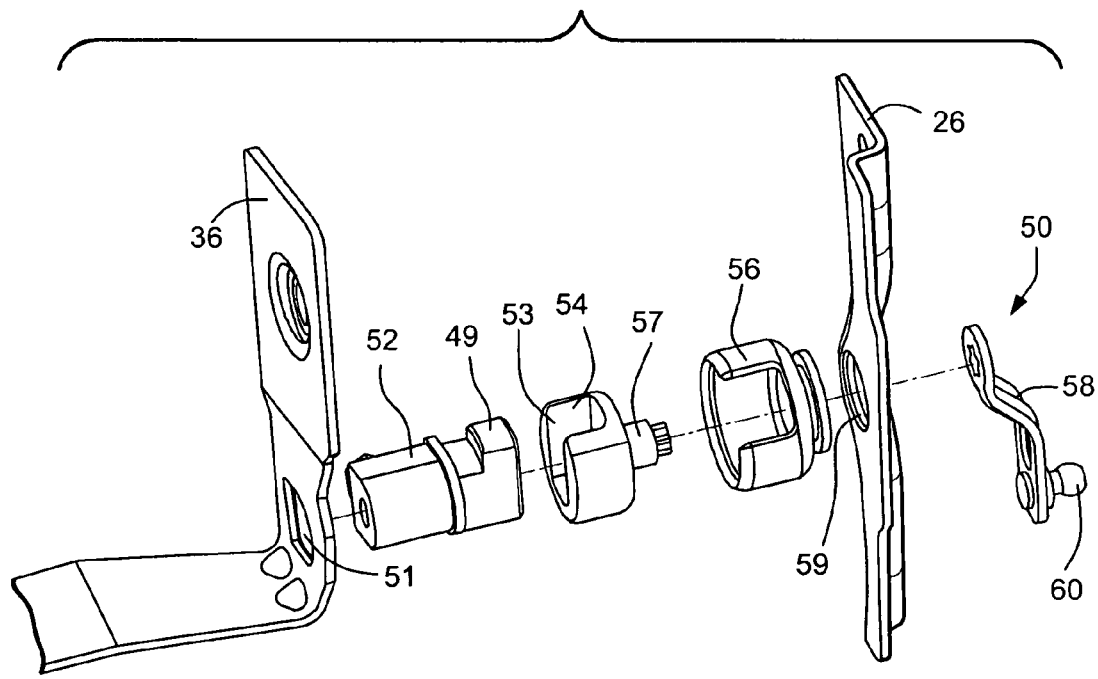
Figure 6A:
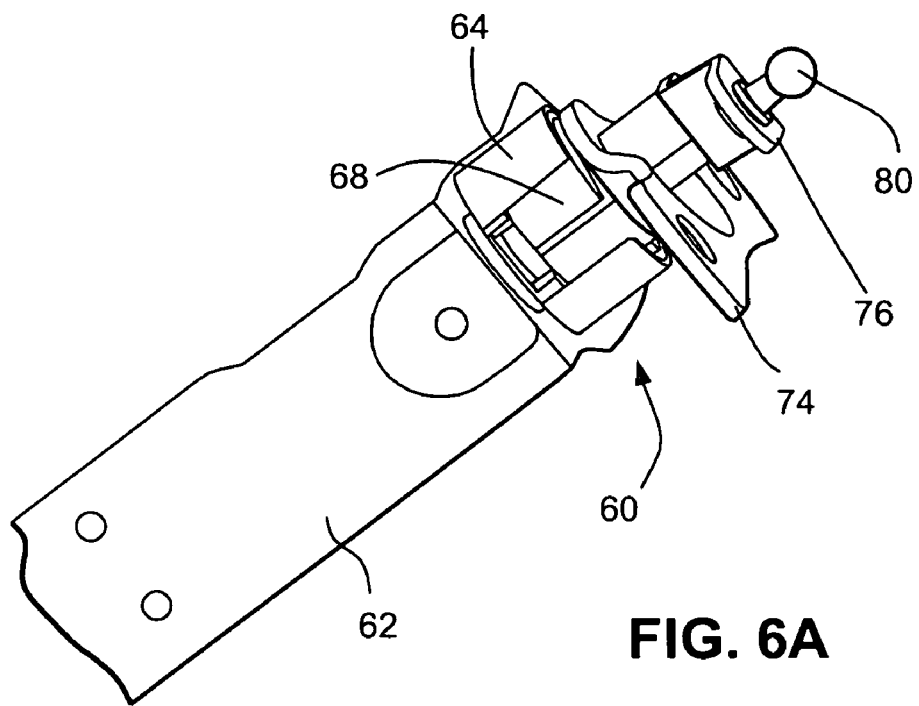
FIGS. 6A through 6D are assembled and exploded perspective views of a second alternative embodiment of components for coupling the tailgate dampening system to the tailgate lift assist system.
Figure 6B:
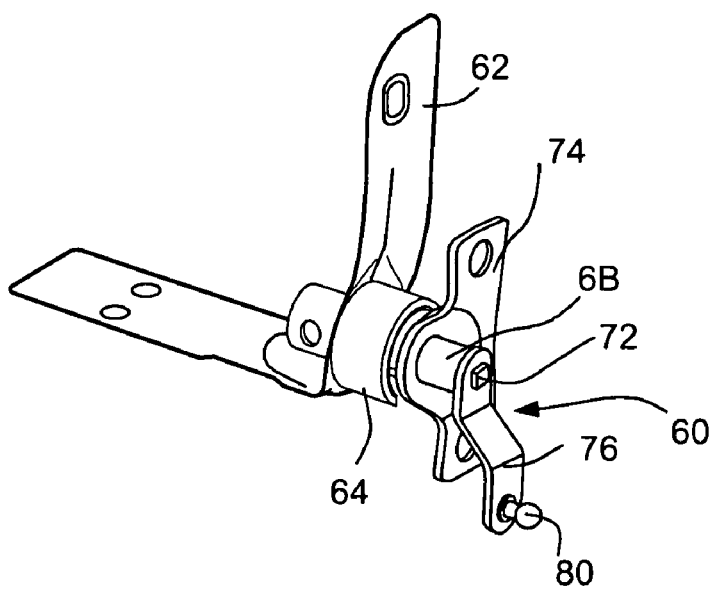
Figure 6C:
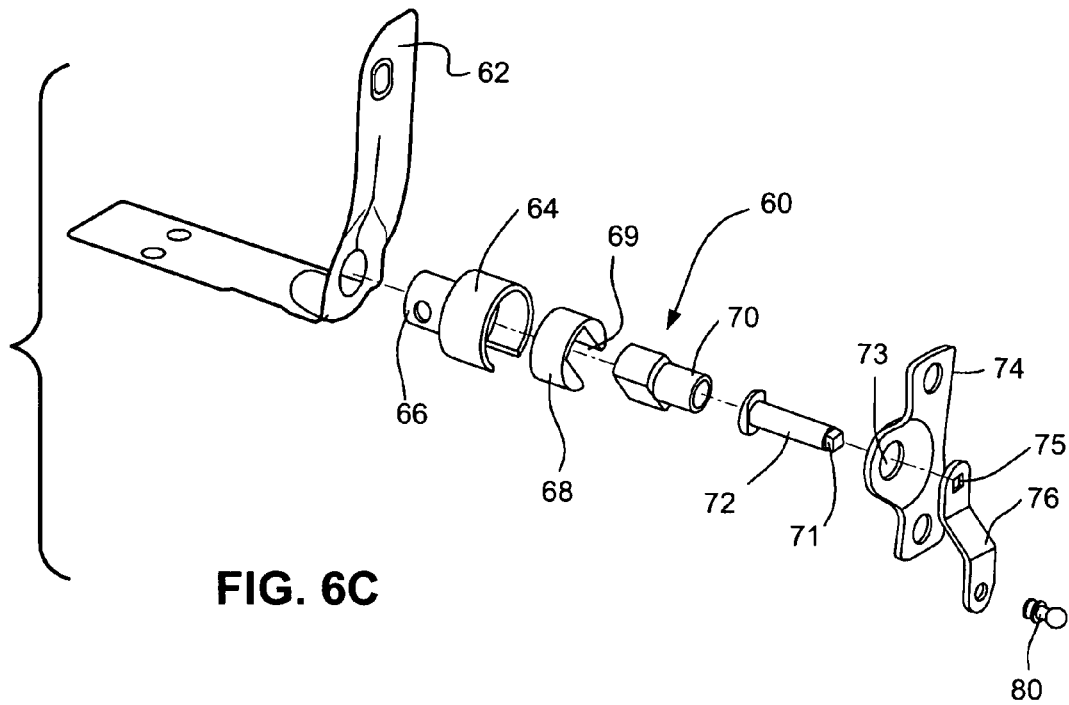
Figure 6D:
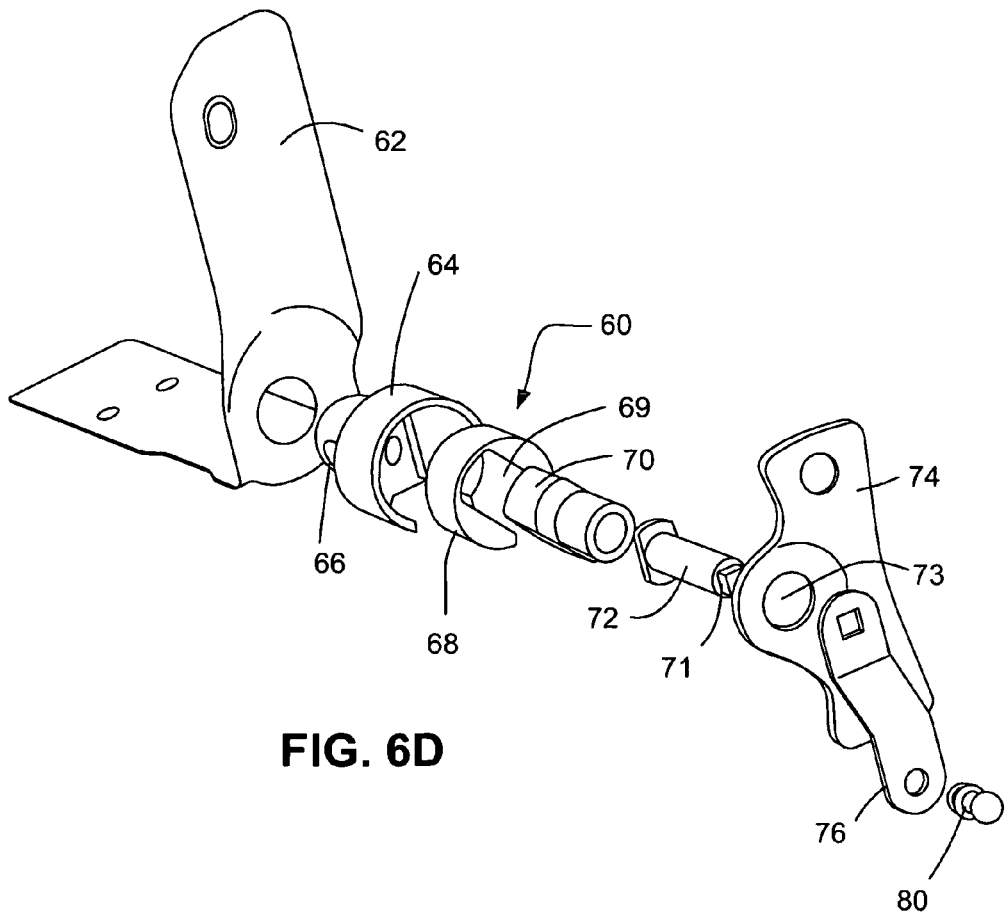

FIGS. 5A and 5B are assembled and exploded perspective views, respectively, showing a first alternative embodiment of components for coupling the tailgate dampening system 12 to the tailgate lift assist system 10. The coupling embodiment shown in FIG. 5 is a simpler embodiment of the present invention. In this embodiment, the torque rod 16 does not connect to coupling shaft 18. Instead, the connection is through a termination post 52 for the torque rod 16. Termination post 52 extends through a hole 51 in gate bracket 36, which is again mounted to the side of tailgate 14. An elongated end 49 of post 52 engages a slot 53 in a pivot body 54 that is positioned within a bushing 56. Bushing 56 is attached to body bracket 26, which is mounted to the vehicle bed/frame. A shaft 57 protruding from one side of pivot body 54 extends through bushing 56 and a hole 59 in body bracket 26. Shaft 57 engages one end of bell crank 58 so as to be rotated by shaft 57 as pivot body 54 is rotated within bushing 56 by termination post 52. As bell crank 58 rotates, it compresses damper strut 22 by reason of being connected to an end 37, joined to bell crank 58 through pivot pin 60, which is connected to an opposite end of bell crank 58 from the end attached to shaft 57.

FIG. 6A through 6D are assembled and exploded perspective views showing a second alternative embodiment of components for coupling the tailgate dampening system 12 to the tailgate lift assist system 10. The coupling embodiment shown in FIGS. 6A to 6D is a variation of the coupling embodiment shown in FIGS. 5A and 5B.

Gate bracket 62 is mounted to the side of tailgate 14. Attached to bracket 62 (typically by welding) is a bushing 64 having a stem 66 through which torque rod 16 is inserted. Positioned within bushing 64 is a pivot body 68, about which bushing 64 rotates. Pivot body 68 includes a slot 69 into which is inserted on top of a termination post 70. Inserted through termination post 70 is a coupling shaft 72 which is driven by an impression in bushing 64 that corresponds in shape to the head of coupling shaft 72. Coupling shaft 72, in turn, extends through a hole 73 in a body bracket 74 attached to the side wall 11 of the vehicle bed/frame. Coupling shaft 72 has an end 71 that engages one end 75 of bell crank 76. The other end 77 of bell crank 76 has a pivot pin 80 inserted in it. Here again, pivot pin 80 engages the connection end 37 of dampening strut 22 so that when bell crank 76 is rotated through the coupling embodiment 60 shown in FIG. 6A through 6D by the tailgate being opened, thereby rotating the tailgate bracket assembly 62 and 64, that engages shaft 72, connected to the crank arm 76, which rotates to cause dampening strut 22 to be compressed for the purpose of dampening tailgate 14 as it is opened.

Some of the advantages to be expected from the use of the tailgate dampening system 12 of the present invention are as follows:

The torque rod lift assist system 10 uses torque rod 16 for the lifting of the tailgate 14. The dampening system 12 only works in one direction, i.e., in connection with the opening of tailgate 14. So, it provides no effect in efforts to lift the tailgate 14.

The dampening strut 22 preferably uses an oil that is relatively temperature independent, although other hydraulic or pneumatic fluids could be used.

The dampening system embodiments shown in FIGS. 5 and 6 are independent of the torque rod lift assist system 10. If one fails, the other system continues to operate.

The dampening system 12 uses the proven strength and rigidity of the tailgate lift assist system 10, so that the dampening system acts strictly as a dampening feature that passes through the pivot post.

The torque rod 16 bears a significant amount of the tailgate's force, so that a relatively small dampening strut 22 is required for meeting the necessary counter balance force.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A tailgate dampening system for a vehicle including a frame and a tailgate lift assist system including a torque rod rotationally grounded between the tailgate at a one end and the vehicle's frame at another end, the dampening system comprising:
   a coupling shaft attached to one end of the torque rod,
   a bell crank arm attached the coupling shaft on a side opposite the torque rod, and
   a dampening strut attached between the vehicle's frame and the bell crank arm,
   the bell crank arm moving the dampening strut as the bell crank arm is rotated by the torque rod through the coupling shaft as the torque rod is twisted in response to the tailgate being opened, the moved dampening strut reducing the rate at which the tailgate falls,
   the dampening strut including a metered piston within a body of the dampening strut, the metered piston including at least one orifice through which a fluid moves from a first side of the piston to a second side of the piston as the piston is moved within the body of the dampening strut by the crank arm as the tailgate is moved to an open position,
   the dampening strut containing an internal check valve, through which an un-metered flow of the fluid from the second side of the piston to the first side of the piston occurs, thereby reducing the dampening by the dampening strut in a direction corresponding to the tailgate being closed, so as to allow the tailgate to be closed with minimal resistance,
   the dampening system performing a dampening function only in connection with the opening of the tailgate, such that it provides no effect in lifting the tailgate.

2. The tailgate dampening system of claim 1, wherein the size of the at least one orifice controlling the amount of fluid that can move from the first side to the second side of the piston at any given time to thereby absorb and dissipate energy resulting from the tailgate opening and reduce the rate at which the tailgate falls when it is opened.

3. The tailgate dampening system of claim 1 further comprising a post and a body bracket attached to the side of the vehicle's bed/frame, the coupling shaft passing through post and body bracket and then being attached to the bell crank arm.

4. The tailgate dampening system of claim 1, further comprising a spacer for providing clearance to the sidewall of the vehicle's body to which the body bracket is attached.

5. The tailgate dampening system of claim 1, wherein the fluid is a hydraulic fluid.

6. The tailgate dampening system of claim 1, wherein the fluid is a pneumatic fluid.

7. A tailgate dampening system for a vehicle including a tailgate lift assist system including a torque rod rotationally grounded between the tailgate at a one end and the vehicle's frame at another end, the dampening system comprising:
- a termination post attached at one end to the torque rod, the termination post having an elongated other end engaging a slot in a pivot body within a bushing attached to a body bracket, the body bracket being mounted to the vehicle's frame,
- a bell crank arm attached to a shaft protruding from one side of the pivot body and extending through the bushing and a hole in the body bracket, and
- a dampening strut attached between the vehicle's frame and the bell crank arm,
- the bell crank arm moving the dampening strut as the bell crank arm is rotated by the torque rod through the termination post and pivot body shaft as the torque rod is twisted in response to the tailgate being opened, the moved dampening strut reducing the rate at which the tailgate falls,
- the dampening strut including a metered piston within a body of the dampening strut through which a fluid to move from a first side of the piston to a second side of the piston as the piston is moved within the body of the dampening strut as the tailgate is moved to an open position,
- the dampening strut containing an internal check valve, through which an un-metered flow of fluid from the second side of the piston to the first side of the piston occurs, thereby reducing the dampening by the dampening strut in a direction corresponding to the tailgate being closed, so as to allow the tailgate to be closed with minimal resistance,
- the dampening system performing a dampening function only in connection with the opening of the tailgate, such that it provides no effect in lifting the tailgate.

8. The tailgate dampening system of claim 7, wherein the dampening strut includes a body and a piston protruding from the body that is attached to the vehicle's body, the piston being compressed into the body as the tailgate is opened.

9. The tailgate dampening system of claim 7, wherein the size of at least one orifice in the metered piston controls the amount of fluid that can move from the first side to the second side of the piston at any given time, thereby using viscous friction to absorb and dissipate energy resulting from the tailgate opening, to thereby reduce the rate at which the tailgate falls when it is opened.

10. The tailgate dampening system of claim 9, wherein a plurality of orifices in the metered piston control the amount of fluid that can move from the first side to the second side of the piston at any given time.

11. The tailgate dampening system of claim 7 further comprising a gate bracket mounted to a side of the tailgate, the termination post extending through a hole in a gate bracket whereupon the elongated end of the termination post engages a slot in the pivot body.

12. The tailgate dampening system of claim 7, wherein the shaft protruding from one side of the pivot body extends through the bushing and a hole in body bracket to the crank arm.

13. The tailgate dampening system of claim 7, wherein the fluid is a hydraulic fluid.

14. The tailgate dampening system of claim 7, wherein the fluid is a pneumatic fluid.

15. A tailgate dampening system for a vehicle including a tailgate lift assist system including a torque rod rotationally grounded between the tailgate at a one end and the vehicle's frame at another end, the dampening system comprising:
- a bushing having a stem through which the torque rod is inserted,
- a pivot body positioned within the bushing and about which the bushing rotates,
- a termination post on top of which is inserted a slot in the pivot body,
- a termination post attached at one end to the torque rod, the termination post having an elongated other end engaging a slot in a pivot body within a bushing attached to a body bracket, the body bracket being mounted to the vehicle's frame,
- a coupling shaft inserted through the termination post, the coupling shaft having a head corresponding in shape to an impression in the bushing so that the coupling shaft is driven by the bushing as it rotates about the pivot body,
- a bell crank arm attached at one end to the coupling shaft, and
- a dampening strut attached between the vehicle's frame and another end of the bell crank arm,
- the bell crank arm moving the dampening strut as the bell crank arm is rotated by the torque rod through the termination post and pivot body shaft as the torque rod is twisted in response to the tailgate being opened, the moved dampening strut reducing the rate at which the tailgate falls,
- the dampening strut including a metered piston within a body of the dampening strut through which a fluid to move from a first side of the piston to a second side of the piston as the piston is moved within the body of the dampening strut as the tailgate is moved to an open position,
- the dampening strut containing a check valve, through which an un-metered flow of fluid from the second side of the piston to the first side of the piston occurs, thereby reducing the dampening by the dampening strut in a direction corresponding to the tailgate being closed so as to allow the tailgate to be closed with minimal resistance,
- the dampening system performing a dampening function only in connection with the opening of the tailgate, such that it provides no effect in lifting the tailgate.

16. The tailgate dampening system of claim 15, wherein the dampening strut includes a body and a piston protruding from the body that is attached to the vehicle's body, the piston being compressed into the body as the tailgate is opened.

17. The tailgate dampening system of claim 15, wherein the size of an orifice in the metered piston controls the amount of fluid that can move from the first side to the second side at any given time, thereby using viscous friction to absorb and dissipate energy resulting from the tailgate opening, to thereby reduce the rate at which the tailgate falls when it is opened.

18. The tailgate dampening system of claim 15, wherein a plurality of orifices in the metered piston control the amount of fluid that can move from the first side to the second side of the piston at any given time.

19. The tailgate dampening system of claim 15, wherein the crank arm is attached to the dampening strut by a pivot pin.

20. The tailgate dampening system of claim 15, wherein the fluid is a hydraulic fluid.

21. The tailgate dampening system of claim 15, wherein the fluid is a pneumatic fluid.

* * * * *